Feb. 5, 1963　　　　　　　J. F. HOFFER　　　　　　　3,076,413
HIGH PRESSURE AIRCRAFT GEAR PUMP
Filed Dec. 29, 1959　　　　　　　　　　　　　　　　6 Sheets-Sheet 1

INVENTOR
James F. Hoffer

BY Mason, Porter, Diller & Stewart
ATTORNEYS

Feb. 5, 1963  J. F. HOFFER  3,076,413
HIGH PRESSURE AIRCRAFT GEAR PUMP
Filed Dec. 29, 1959  6 Sheets-Sheet 3

INVENTOR
James F. Hoffer
BY
Mason, Porter, Diller & Stewart
ATTORNEYS

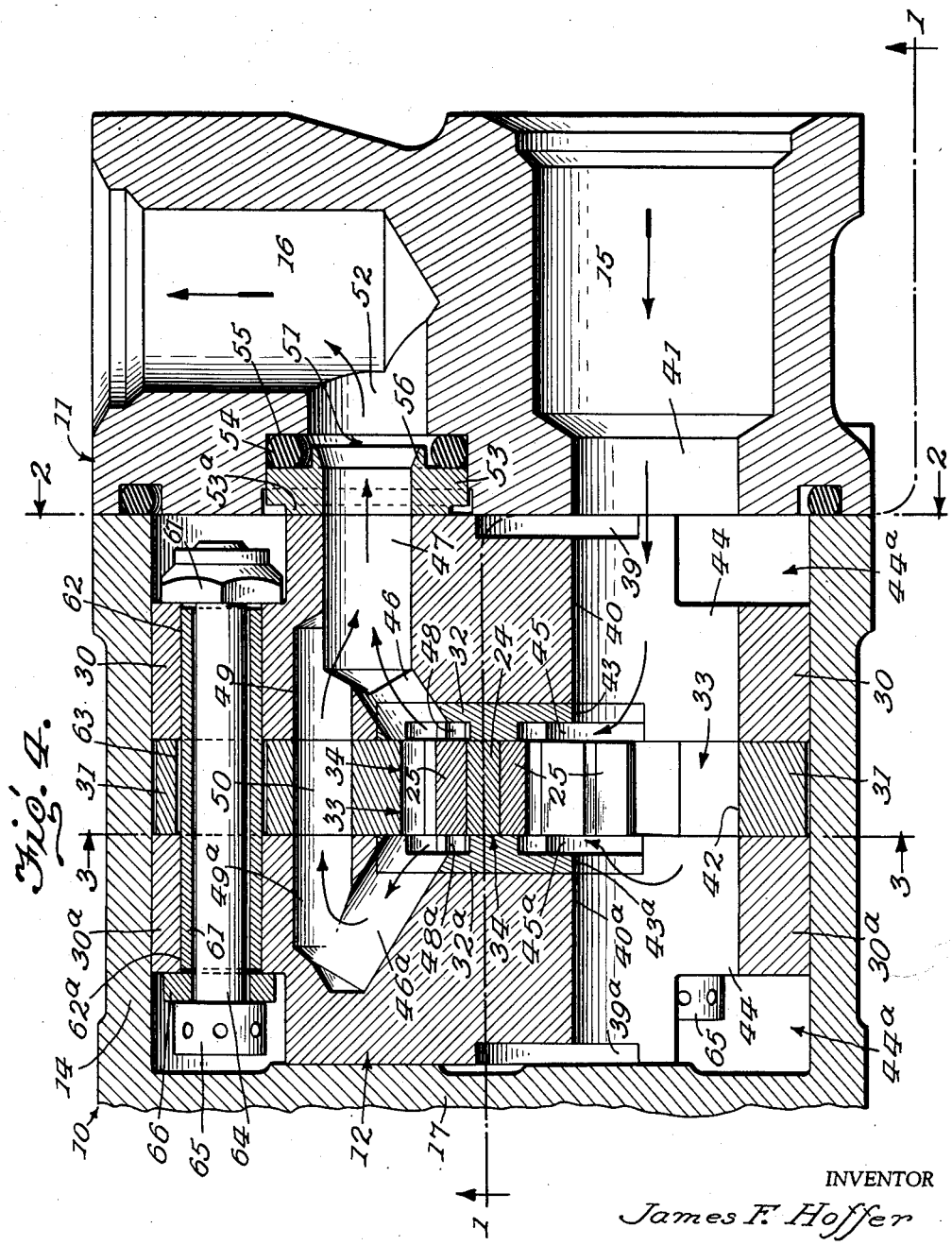

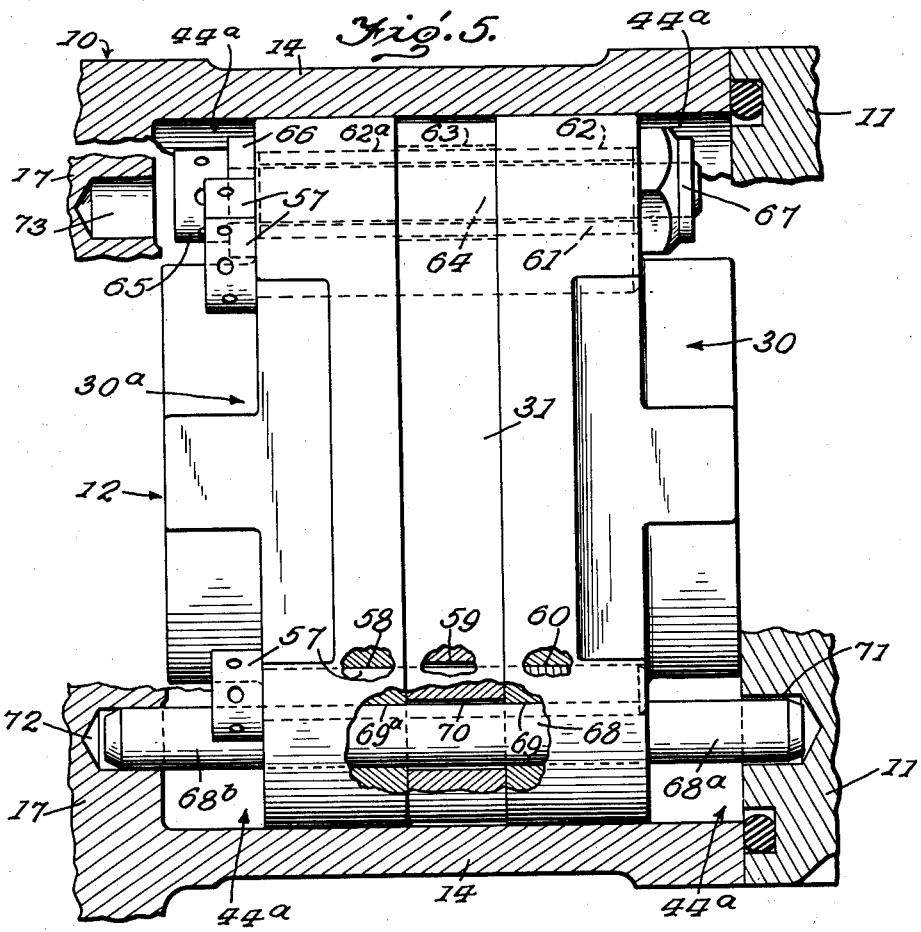
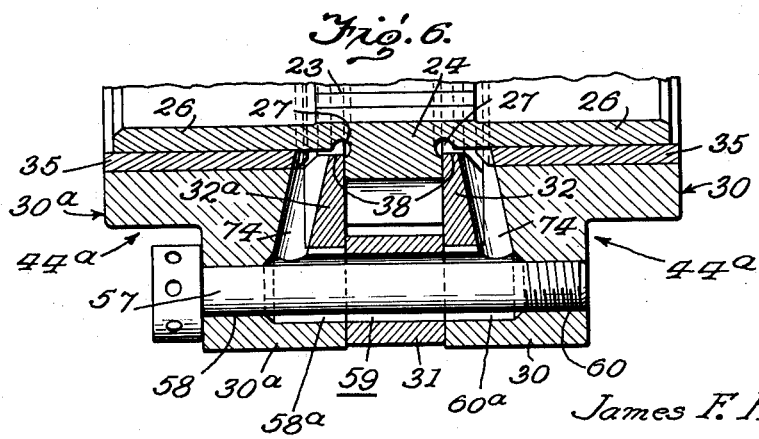

Feb. 5, 1963    J. F. HOFFER    3,076,413
HIGH PRESSURE AIRCRAFT GEAR PUMP
Filed Dec. 29, 1959    6 Sheets-Sheet 6

INVENTOR
James F. Hoffer
BY
Mason, Porter, Diller & Stewart
ATTORNEYS

United States Patent Office 3,076,413
Patented Feb. 5, 1963

3,076,413
HIGH PRESSURE AIRCRAFT GEAR PUMP
James F. Hoffer, Redondo Beach, Calif., assignor to Parker-Hannifin Corporation, Cleveland, Ohio, a corporation of Ohio
Filed Dec. 29, 1959, Ser. No. 862,567
18 Claims. (Cl. 103—126)

This invention relates to gear pumps of the fixed clearance type in which the gears, gear end plates, and a center plate which surrounds the gears and spaces the end plates so as to form the fixed clearance between the end plates and gears, are assembled as a cartridge for insertion in a pump body or housing.

An object of the present invention is to provide a completely reliable, high performance type pump of light weight and minimum bulk which is suitable for aircraft and missile installations for fluid discharge pressures up to 3,000 p.s.i. and rotative speeds as high as 20,000 r.p.m. for continuous duty and 60,000 r.p.m. or more for intermittent duty. Such requirements for gear type pumps are extremely exacting. The present invention makes possible the attainment of such requirements without undue manufacturing difficulties and with a high degree of operational reliability.

An object of the present invention is to make the cartridge assembly as rigid as possible and with a one-piece center plate which may be securely clamped in an adjusted position about the gears so as to retain its set position. The one-piece construction furthermore adds to the rigidity of the cartridge in all diametrical planes.

It is another object to provide a novel and simple way of aligning and tying the gear end plates together with the gears and center plate therebetween. To this end, a dowel sleeve through which a clamping bolt extends is provided at the high pressure side of the pump while a simple dowel pin is provided near the inlet or low pressure side of the cartridge. The latter dowel pin has its ends projecting beyond the two ends of the cartridge and is further utilized as a means for insuring correct assembly of a housing cap containing the housing inlet and outlet ports to insure that such ports are in registry with the cartridge inlet and outlet ports in either of two positions of the cartridge within the housing body, depending upon the direction in which the pump drive shaft is to be rotated. For clockwise rotation of the drive shaft the cartridge is assembled in one position within the body with one end of the dowel pin in a locating hole within the body and the other end of the dowel pin in a hole in the cap. When the direction of rotation is to be reversed, the cap and cartridge are removed from the body, the cartridge is rotated 180° from its former position and is located in its new position by reason of one end of the dowel pin entering a second hole within the housing. Only the one locating hole is provided in the cap so that to assemble the cap to the body, the cap must also be rotated 180°. This insures that the cap will be rotated with the cartridge so as to keep the inlet and outlet ports of the cap in registry with the inlet and outlet ports of the cartridge.

Another object is to assure complete filling of the between-teeth pockets of the gears under the high rotative speeds to which the gears are subjected. This is done by camming the gear-whirled fluid centrifugally thrown from pockets back into such pockets before they reach the delivery side of the pump, thereby materially reducing prior cavitation difficulties.

A further object is to provide the cartridge with novel inlet passage means which, with adequate inlet pressure, will supply some of the ingoing fluid into spaces between the cartridge and the casing ends, for cooling purposes.

A still further object is to provide novel means for conducting any cartridge leakage into the casing at the high-pressure side of the pump, back to the inlet passage means of the cartridge.

Still another object is to make novel provision which will assure that the fluid handled by the pump will adequately lubricate and equally cool all of the bearing stubs of the gears and the bearings in which these stubs are mounted.

Another object is to provide an improved construction for the thrust ring which is subjected to the pressure of the pump fluid and exerts strong sealing pressure on the cartridge.

A still further object is to provide a novel and advantageous method for attaining the desired running clearances at the peripheries of the gears and the bearing stubs.

With the above, and other objects in view that will hereinafter appear, the nature of the invention will be more clearly understood by reference to the following detailed description, the appended claims, and the several views illustrated in the accompanying drawings.

In the drawings:

FIGURE 1 is a central vertical longitudinal sectional view, with the end cap of the casing in elevation, as indicated by the lines 1—1 of FIGURES 2, 3 and 4.

FIGURES 2 and 3 are vertical transverse sectional views on lines 2—2 and 3—3 of FIGURES 1 and 4.

FIGURE 4 is a horizontal sectional view on the lines 4—4 of FIGURES 1, 2 and 3.

FIGURE 5 is a top plan view of the cartridge, also showing fragments of the pump casing to relate the dowel pin of the cartridge with the dowel pin sockets of the casing.

FIGURE 6 is a fragmentary longitudinal sectional view of the cartridge. This view is cut on line 6—6 of FIGURE 3, but a view cut on line 6ª—6ª of FIGURE 3 would be substantially the same.

For illustrative purposes, the pump has been shown in a position in which the axes of the pumping gears are horizontal and in a vertical plane. For simplicity of explanation, it will be described in this position. It is to be understood, however, that wording used in so doing, for example, "upper," "lower" and "top," are to be considered as relative and not limiting.

Figure 2:
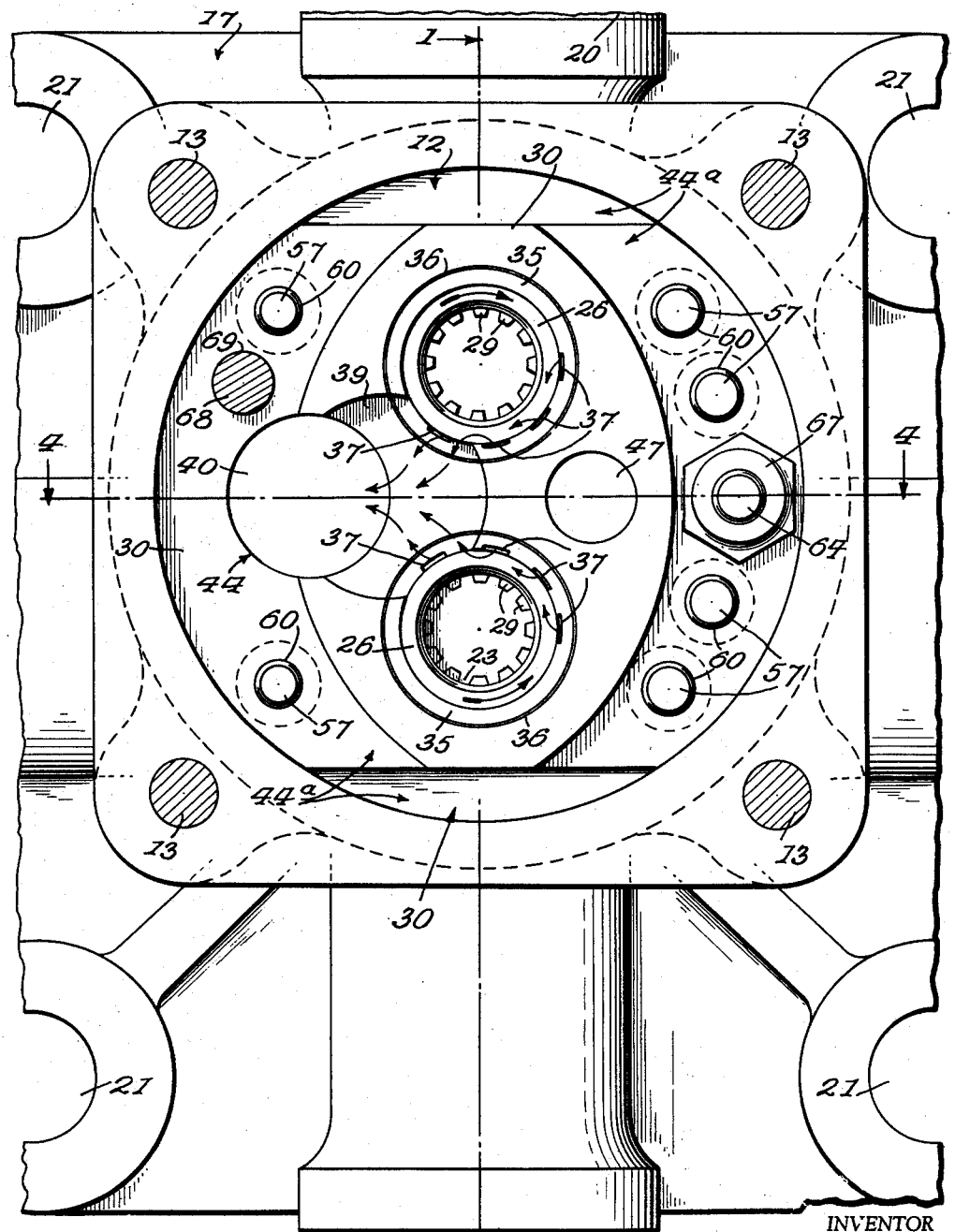

A cupped body 10 and an end cap or port head 11 coact in forming a cylindrical casing in which a cylindrical cartridge 12 is housed. The end cap 11 is secured by screws 13 to the side wall 14 of the body 10, and this side wall is internally cylindrical. The end cap 11 has a fluid inlet passage 15 and a fluid outlet passage 16, best shown in FIGURE 4. The end wall 17 of the cupped body 10 is recessed to contain a suitable seal assembly 18 and is provided with seal drain passages 19 which are normally closed by plugs 20 except the one nearest the gravitational bottom which in actual installation is not plugged. This end wall 17 is formed with openings 21 (FIGURE 2) to receive bolts or screws for mounting the pump on a suitable support.

A drive shaft 22 extends through the seal assembly 18 and into the cartridge 12. The inner end of this shaft is located about midway of the length of the cartridge 12 and is splined at 23 to engage and drive one of the meshed pump gear 24, 25 which form elements of the cartridge 12. The drive shaft 22 is located to engage the lowermost of the gears. This is the gear 25 in the present disclosure as it is assumed that the drive shaft 22 rotates clockwise (when viewed from the left) and this is the required direction of rotation for said gear 25 (see FIGURE 3). However, in any installation in which the drive shaft 22 must rotate counterclockwise, said shaft is engaged with the gear 24 which must rotate counterclockwise. This change of having the shaft 22 engage gear 24 instead of gear 25, is effected by installing the cartridge 12 and the cap plate 11 in position turned 180° from those shown.

Each gear 24, 25 has two oppositely projecting tubular bearing studs 26 and two peripheral grooves 27 at its juncture with said stubs 26. The gear has a bore 28 communicating with the interiors of the stubs 26: and the wall of this bore has integral spline ribs 29 to engage the spline ribs 23 of the drive shaft 22. The grooves 27 are desirable to conduct fluid for lubricating and cooling purposes.

Figure 1:
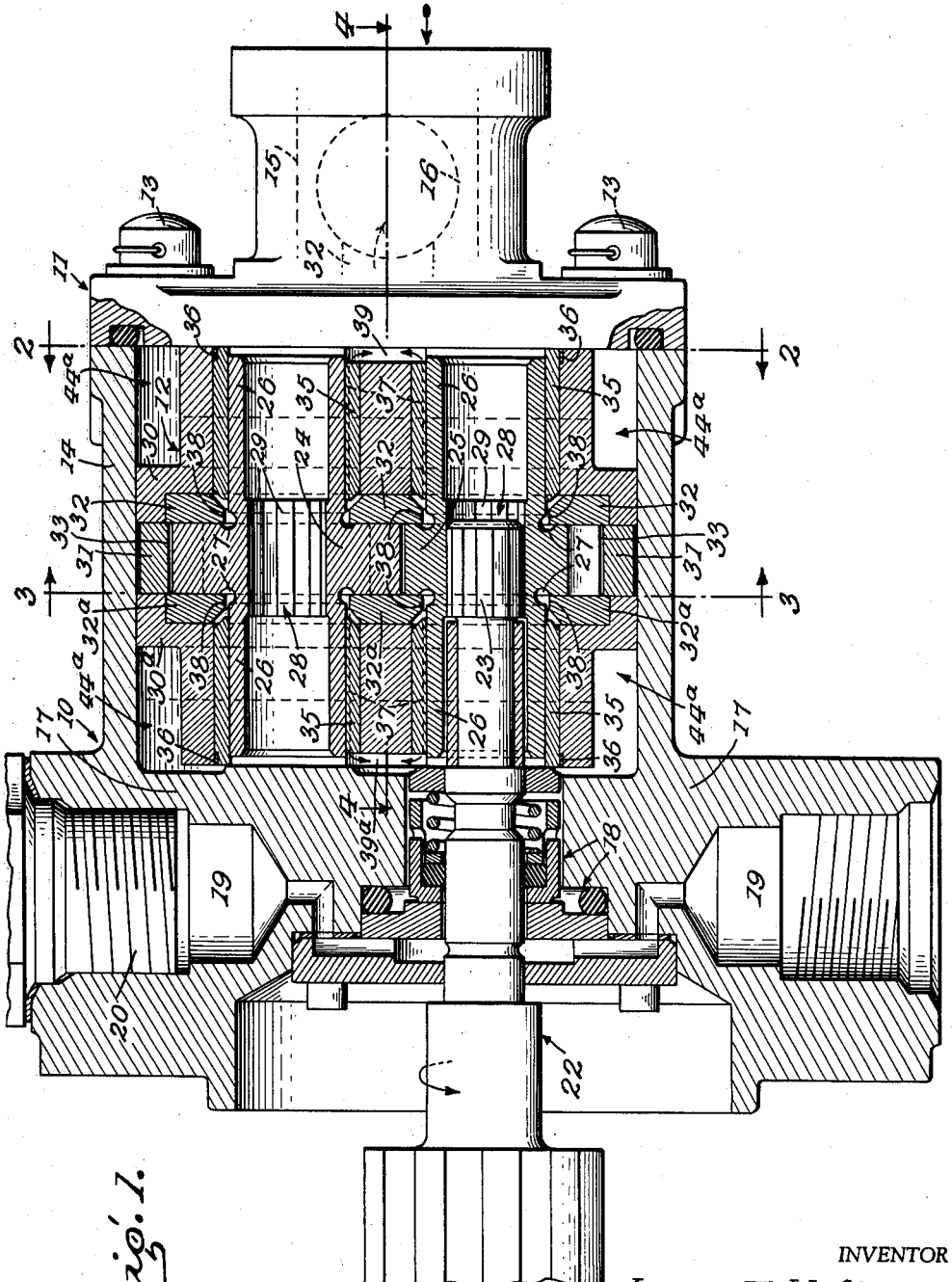

The cartridge 12 includes two end plates 30 and 30$^a$, and a center plate 31 clamped between said end plates. End plate 30 abuts the thrust ring 53, and end plate 30$^a$ is forced into abutment with the end wall 17 of the cupped member 10 by hydraulic pressure exerted against thrust ring 53. Wear plates 32 and 32$^a$ are inset in the inner sides of the end plates 30 and 30$^a$, respectively: and the center plate 31 has an opening 33 which coacts with said wear plates in forming a chamber 34 in which the gears 24 and 25 are located. The end plates 30 and 30$^a$ have bearing bores in which bushings 35 are secured by solder 36. These bushings 35 rotatably receive the bearing stubs 26 of the gears 24 and 25. Longitudinal grooves 37 are formed in the inner unloaded sides of the bushings 35 to conduct fluid for lubrication and cooling purposes. The inner ends of the bushings 35 (see FIGURE 1) terminate in spaced relation with the wear plates 32 and 32$^a$: and the wear plate openings 38 through which the stubs 26 extend are of appreciably larger diameter than said stubs. The grooves 37 which open through both the inner and the outer ends of the bushings 35 are thus placed in communication with the peripheral grooves 27 of the stubs 26. The outer ends of the grooves 37 open restrictedly through the outer ends of the bushings 35: and the outer sides of the end plates 30 and 30$^a$ have shallow bores 39 and 39$^a$, respectively (FIGURES 1, 2 and 4), with which all of said grooves 37 communicate. The shallow bores 39, 39$^a$ intersect and communicate with aligned fluid inlet openings 40, 40$^a$ formed in the end plates 30 and 30$^a$, respectively, as will be clear by joint consideration of FIGURES 2 and 4. Thus, the peripheral grooves 27 of the bearing stubs 26 are conductively connected with the inlet openings 40, 40$^a$, by means of the wear plate openings 38, bushing grooves 37, clearance at ends of gear stubs 26, and shallow bores 39, 39$^a$. Consequently any of the pumped fluid finding its way into the grooves 27 will return to the inlet or low pressure side of the pump and in so doing will perform cooling and lubricating functions.

The outer end of the opening 40 communicates axially through an opening 41, in the cap 11, with the fluid inlet 15, as seen in FIGURE 4. The inner ends of both of the openings 40 and 40$^a$ open into the center plate opening 33; the edge wall of this opening 33 has a notch 42 (FIGURES 3, 4 and 8) corresponding to part of the circumference of said openings 40, 40$^a$; and the outer edges of the wear plates 32, 32$^a$ have similar notches 43, 43$^a$, respectively, corresponding to most of the remainder of said circumference. The inlet 15 (see FIGURE 4), the opening 41, the opening 40, the notches 42 and 43, 43$^a$ and the opening 40$^a$ thus form inlet passage means for the fluid to be pumped. This passage means not only communicates with the gear chamber 34, but the outer ends of the two openings 40 and 40$^a$ of said passage means also laterally communicate at 44 (FIGURE 4) with spaces 44$^a$ formed by cutting away portions of the end plates 30, 30$^a$. Thus, some of the ingoing fluid is admitted to the pump casing around end portions of the cartridge 12 for cooling purposes and any leakage into the casing from the high pressure or outlet side of the pump will be returned to the inlet passage means aforesaid.

Figure 7:
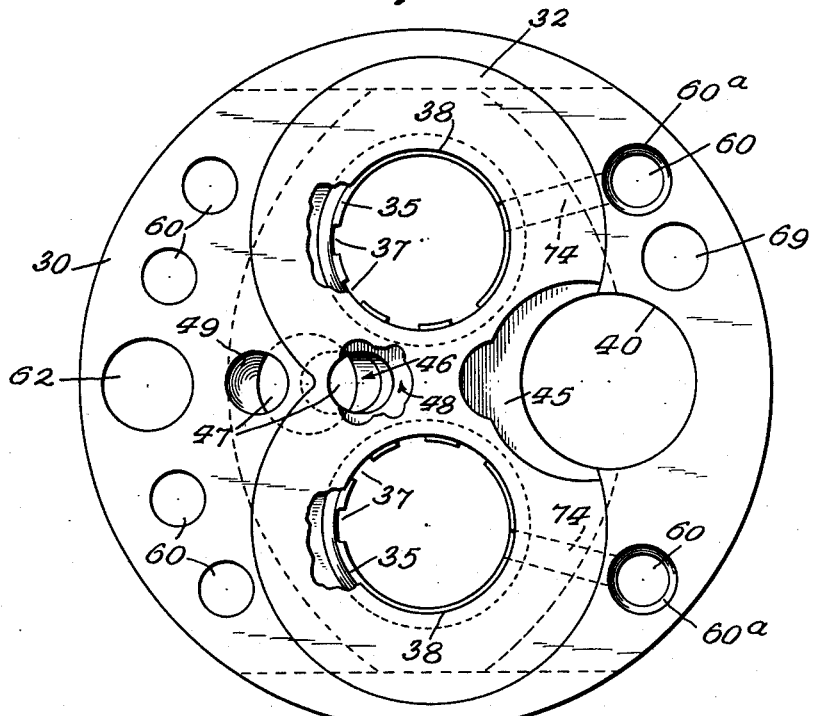
FIGURE 7 is an inner side view of one of the end plates of the cartridge.

To facilitate entrance of fluid from the inlet passage means to the pockets between teeth of the gears 24, 25, the opposed sides of the wear plates 32, 32$^a$ have shallow recesses 45, 45$^a$ (FIGURES 3, 4 and 7) which expose the ends of said pockets and communicate with the notches 43, 43$^a$, respectively. However, cavitation and centrifugal throwing of the fluid are factors which must be reduced to the minimum for efficiency; and such reduction is attained as described below.

The edge wall portions 33$^a$ (see FIGURES 3 and 8) of the center plate opening 33 are spaced from the periphery of the gears 24, 25 and each of these edge wall portions 33$^a$ is substantially convolute from the notch 42 (forming part of the fluid inlet passage), to a point 33$^b$ toward the high pressure side of the pump: and the space between said wall portion 33$^a$ and the outer ends of the gear teeth gradually diminishes to nil (except for running clearance) at said point 33$^b$. From the point 33$^b$ to a point 33$^c$ opposite the point P of maximum meshing of the two gears, the side wall portion 33$^d$ is concentric with the gears 24 and 25 and has running clearance therewith.

During rapid rotation of the gears 24, 25 in opposite directions, some of the fluid in the between-teeth pockets of said gears, is centrifugally thrown from said pockets and is circumferentially thrown also in the direction of gear rotation. Such fluid, however, is intercepted by the convolute wall portions 33$^a$ and is cammed back into the pockets before these pockets reach the points 33$^b$. This results in substantially complete filling of the gear pockets and almost entirely overcomes prior effects of cavitation. The fluid carried by the pockets to the high pressure or outlet side of the pump, is conducted to the fluid outlet 16 through outlet passage means now to be described.

Between the point 33$^c$ at which the wall portions 33$^d$ meet each other, and the point P of the maximum gear meshing, the cartridge end plate 30 and its wear plate 32 (see FIGURES 3, 4 and 7) have a diagonal bore 46 drilled therein. The end plate 30 also has a relatively large diameter blind bore 47 parallel with the gear axis and drilled inwardly from the outer side of said end plate. The outer end of the bore 46 opens into the inner end of the bore 47: and the wear plate 32 has a shallow recess 48 into which the inner end of said bore 46 opens. The recess 48 is so located that the between-teeth pockets of the gears 24, 25 successively communicate with it for discharge of the fluid carried over from the low pressure side of the pump by said pockets. The length of the recess 48, measured about concentrically with the gears 24 and 25, is considerably greater than the maximum width of the gear pockets correspondingly measured: and the diameter of the bore 46 is at least as great as said maximum width, allowing fluid discharge from said pockets with minimum resistance.

The cartridge end plate 30$^a$ and its wear plate 32$^a$ have a diagonal bore 46$^a$ corresponding to the bore 46. The inner end of this bore 46$^a$ opens into the shallow recess 48$^a$ corresponding to the recess 48 and formed in the wear plate 32$^a$. The bore 46$^a$ is longer than the bore 46 and the outer end of said bore 46$^a$ opens into a bore 49$^a$ (FIGURE 4) drilled in the end plate 30$^a$ on an axis parallel with the axes of the gears 24, 25. On this same axis, the end plate 30 has a bore 49, and the center plate 31 has a bore 50. The bore 50 established communication between the bores 49 and 49$^a$: and the outer end of the bore 49 opens laterally into the inner end of the relatively large bore 47 in the end plate 30. The various bores related as shown and described, permit more expeditious manufacture than when employing prior somewhat similar arrangements.

Figure 3:
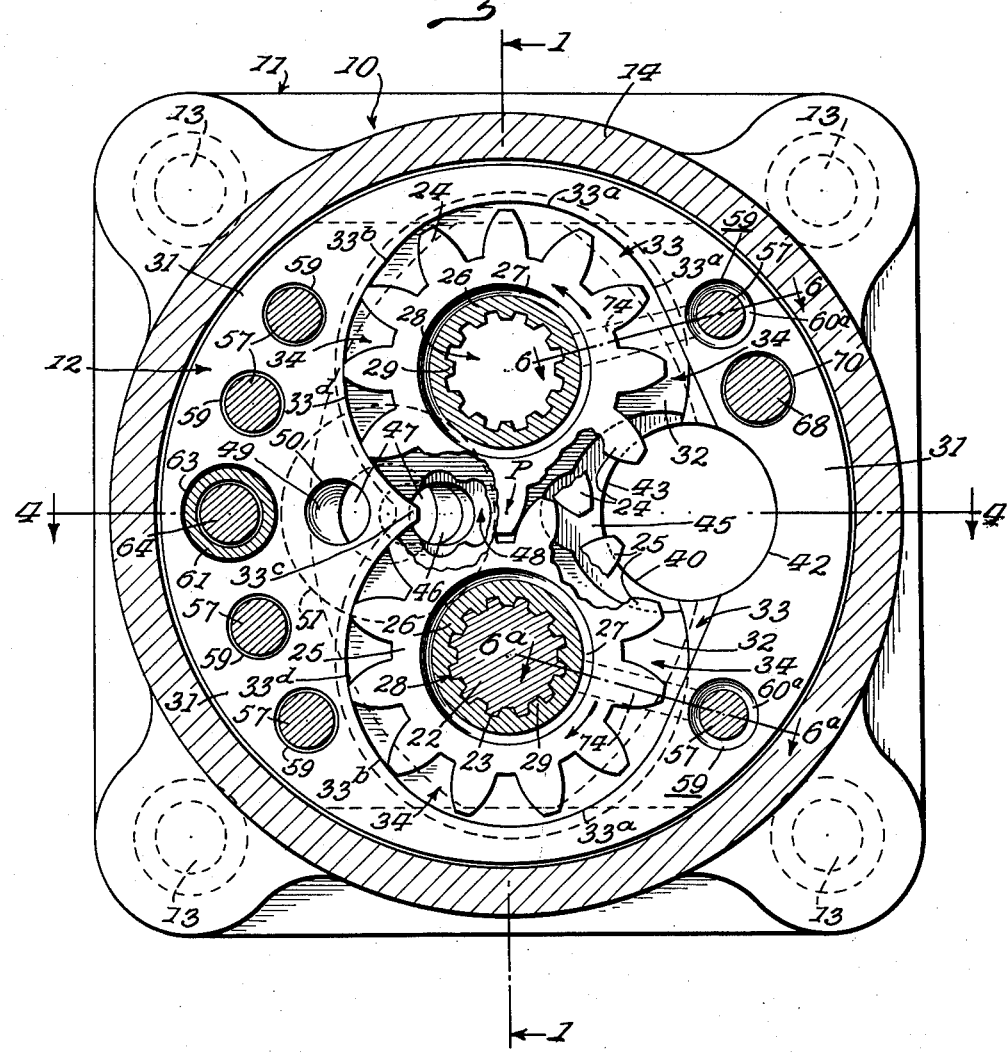

At the outer end of the bore 47 and concentric therewith, the inner side of the cap plate 11 has a shallow cylindrical recess 51 (full lines in FIGURE 4 and dotted in FIGURE 3). This recess is of larger diameter than the bore 47 and it is centrally placed in communication with the outlet 16 by means of a bore 52 in the cap plate 11.

Within the recess 51, a circular thrust ring 53 is mounted. This ring 53 has slight peripheral clearance with the cylindrical side wall of the recess 51; the inner side of said ring 53 abuts the end plate 30; and a single O-ring seal 54 is interposed between the outer side of said ring 53 and the end wall 55 of said recess 51. The thrust ring 53 has a narrow flange 56 surrounded by the O-ring seal 54 but this flange is spaced from the recess end wall 55 to permit the pressure of the outgoing fluid to act against the outer side of said thrust ring 53. This ring 53 thus exerts endwise pressure on the cartridge 12 centrally at the high-pressure side of the pump, to aid in resisting any tendency of the fluid pressure in the gear chamber 34 to slightly separate the cartridge end plates 30 and 30$^a$ from the center plate 31. The portion 53$^a$ of the thrust ring 53 which contacts with the cartridge end plate 30, is of reduced diameter and area and the contacting surfaces of said ring and end plate are flat-lapped to insure leak-proof engagement thereof. The differential areas of the thrust ring exposed to discharge pressure (including gradient hydraulic pressure on flat sealing faces) causes heavy abutment force on the sealing surfaces.

Longitudinal tie screws 57 (FIGURES 2, 3, 5 and 6) extend through openings 58 in the end plate 30$^a$ and through larger openings 59 in the center plate 31, and are threaded into openings 60 in the end plate 30, thereby further resisting any tendency of the plates 30, 30$^a$ and 31 to separate under the influence of pressure in the gear chamber 34. There are preferably four of these screws at the high-pressure side of the pump and two at the low pressure side.

As seen more particularly in FIGURE 4, a dowel sleeve 61 extends snugly through openings 62 and 62$^a$ in the end plates 30 and 30$^a$, respectively, and through a larger opening 63 in the center plate 31. The dowel sleeve 61 is centrally located at the high-pressure side of the pump, as seen in FIGURE 3. A clamping bolt 64 extends through the sleeve 61, has a head 65 and washer 66 at one end, and a nut 67 at the other end. The washer 66 abuts the end plate 30$^a$, and the nut 67 abuts the end plate 30. The clamping effect of the bolt 64 and the screws 57, particularly those at the high pressure side of the pump, combines with the pressure exerted by the thrust ring 53 to prevent any serious distortion of the end plates 30 and 30$^a$ under the pressure of the pumped fluid and thus said end plates are held tightly in place, with nothing more than running clearance between their wear plates 32 and 32$^a$ and the gears 24 and 25.

A dowel pin 68, best shown in FIGURE 5, extends snugly through openings 69 and 69$^a$ in the cartridge end plates 30 and 30$^a$, respectively, and extends also through a larger opening 70 in the center plate 31. One end 68$^a$ of this dowel pin 68 projects beyond the end plate 30 and is received in a socket 71 in the cap plate 11. The other end 68$^b$ of the dowel pin 68 projects beyond the end plate 30$^a$. When the gear 25 is to be driven by the drive shaft 22, as herein shown, the dowel pin end 68$^b$ is received snugly in a socket 72 in the end wall 17 of the cupped member 10, as seen in FIGURE 5. If the drive shaft 22 is to drive the gear 24, however, for reasons above explained, the cartridge 12 and cap 11 must occupy a position turned 180° from that shown. Then, the dowel pin end 68$^b$ is snugly receivable in another socket 73 (FIGURE 5) in the end wall 17 of the member 10.

The dowel sleeve 61 and dowel pin 68 align the two cartridge end plates 30 and 30$^a$, and the pin 68 also insures proper positioning of the cartridge 12 in the casing, regardless of which gear is to be driven. Due to oversize of the various screw and dowel receiving openings in the center plate 31, this center plate may be radially adjusted slightly with respect to the end plates 30 and 30$^a$ during assembly, to obtain proper clearance with the gears 24 and 25. Due to this adjustability, the center plate 31 must be of somewhat smaller diameter than the internal diameter of the casing side wall 14. The end plates 30 and 30$^a$, however, are of a diameter to snugly yet withdrawably fit into said side wall 14.

Figure 8:
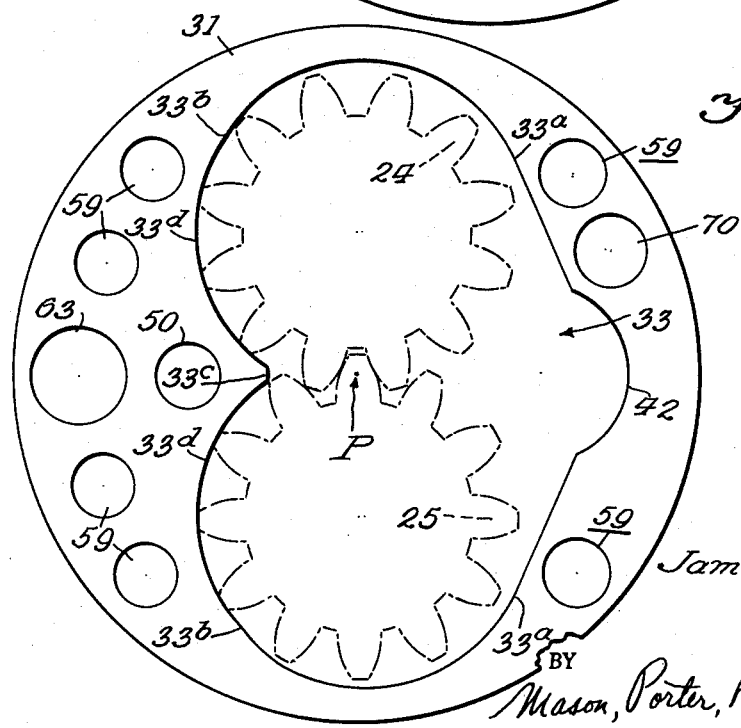
FIGURE 8 is a side view of the center plate of the cartridge.

As seen in FIGURES 3, 6 and 8, the two screw openings 59 at the low pressure side of the pump are of considerably greater diameter than the rest of the openings 59. The openings 58 and 60 aligned with said two openings 59, are counterbored at 58$^a$ and 60$^a$, in registration with said two openings 59. From the counterbores 58$a$ and 60$^a$, passages 74 extend to the regions of the grooves 27 in the peripheries of the bearing stubs 26 of the gears 24 and 25 and communicate with the central openings 38 in the wear plates 32 and 32$^a$. Consequently, the pressure and quantity of the fluid acting to lubricate and cool the bearing stubs and bushings at one side of the gears, are equalized with the pressure and quantity of the fluid acting to lubricate and cool the bearing stubs and bushings at the other side of the gears. More uniform cooling and lubrication are thus made possible.

While only one passage 74 is shown in communication with each counterbore 58$^a$, 60$^a$, for illustrative purposes, an upper and a lower passage could well be employed instead, if desired.

Particular attention is invited to the following which greatly improve the pump over prior structures:

(1) The cartridge 12 may be more expeditiously and less expensively manufactured.

(2) It will better resist high-speed and high-pressure operation, as the single center plate 31 is unbroken throughout its periphery and thus effectively coacts with the end plates 30 and 30$^a$ and the connecting screws and dowels in producing a rigid cartridge body.

(3) A single simple dowel pin 68 with projecting ends 68$^a$ and 68$^b$, aids in aligning the cartridge end plates 30 and 30$^a$, and said projecting ends coact with the sockets 71 and 72 or 71 and 73 to insure proper positioning of the cartridge in the casing and proper positioning of the cap 11.

(4) The dowel sleeve 61 coacts with the dowel pin 68 in aligning the cartridge end plates 30 and 30$^a$ and also accommodates a simple clamping bolt 64 without requiring additional openings in the cartridge.

(5) More complete filling of the between-teeth pockets of the gears is attained and any fluid thrown from these pockets is cammed back into them by the convolute wall portions 33$^a$ of the center plate opening 33.

(6) The inlet passage 15, 41, 40, 43, 42 and 40$^a$ (FIGURE 4) not only supplies fluid to the gear chamber 34 but, when the inlet pressure is adequate, conducts some of ingoing fluid to the spaces 44$^a$ around end portions of the cartridge, for effective cooling: and any leakage from the high-pressure side of the pump enters said spaces and is returned to said inlet passage. Moreover, the fluid entering and flowing between the bushings 35 and the bearing stubs 26, for lubricating and cooling the bearings, is returned to the inlet passage through the shallow bores 39 39$^a$. Also, the quantity and pressure of the lubricating fluid for the stubs 26 at opposite sides of the gears, are equalized, due to the passage means 59, 58$^a$, 60$^a$ and 74 of FIGURE 6, for uniform lubrication and cooling.

(7) As the running clearance between the gears and the gear chamber wall portions 33$^d$, and the clearance between the stubs 26 and bushings 35 should be uniform, gauging of the latter clearance with temporary shims during assembly, will necessarily create the former clearance, and any shifting of the center plate 31 which said gauging may require is permitted by the relatively large dowel and screw openings through said center plate.

From the foregoing, it will be seen that novel and advantageous construction has been provided for attaining

I claim:

1. In a rotary gear pump, a casing having a side wall and end closures therefor, said casing having a fluid inlet and a fluid outlet through one of said end closures, a cartridge within said casing and including a body containing pumping gears, said cartridge body and casing having portions coacting in forming spaces between the ends of said cartridge body and said end closures, said cartridge body having a longitudinal fluid conducting inlet passage for conducting fluid to said pumping gears, said fluid conducting inlet passage extending unrestrictively from end to end of said cartridge body and having one of its ends in communication with said fluid inlet, both ends of said fluid conducting passage being also in constant communication with the aforesaid spaces.

2. In a rotary gear pump, a casing having a side wall and end closures therefor, said casing having a fluid inlet and a fluid outlet through one of said end closures, a cartridge within said casing and including a body containing pumping gears, said cartridge body and casing having portions coacting in forming spaces between the ends of said cartridge body and said end closures, said cartridge body having a longitudinal fluid conducting inlet passage for conducting fluid to said pumping gears, said fluid conducting inlet passage extending unrestrictively from end to end of said cartridge body and having one of its ends in axial communication with said fluid inlet, both ends of said fluid conducting passage being also in constant lateral communication with the aforesaid spaces.

3. A structure as specified in claim 1, in which said gear means has bearing stubs and said cartridge body has separate bearings in which said stubs are mounted, said cartridge body having fluid conducting means placing the interiors of said bearings in communication with said ends of said inlet passage respectively.

4. A structure as specified in claim 1, in which said gear means has bearing stubs and said cartridge body has bearings in which said stubs are mounted, the outer ends of said bearings being disposed at the ends of said cartridge body, said body ends having shallow bores which peripherally intersect said bearings and the aforesaid ends of said inlet passage, said shallow bores placing the outer ends of said bearings in communication with said ends of said inlet passage respectively.

5. In a rotary gear pump, a body containing pumping gears, said gears each having bearing stubs at its opposed sides, said body having separate bearings of the bushing type in which said stubs are mounted with clearance to receive some of the pumped fluid for lubrication, said body having passage means placing the bearings at one side of said gears in communication with the bearings at the other side of said gears.

6. A structure as specified in claim 5, in which said body comprises end plates and a center plate clamped together by longitudinally disposed fasteners extending through openings therein, at least some of said aligned openings having portions of sufficient internal diameter for fluid conduction axially around said fasteners and constituting longitudinal portions of said passage means, said body having transverse passages communicating with said longitudinal portions and constituting the ends of said passage means.

7. In a rotary gear pump, a body having a gear chamber and fluid inlet and outlet means therefor, meshed pumping gears mounted in said gear chamber in operative relation with said inlet and outlet means, said gear chamber having for each pumping gear a convolute side wall portion which extends from said inlet in the direction of gear rotation a substantial distance around the gear to one point spaced in degrees from the point of maximum gear meshing, said gear chamber also having a cylindrical wall portion extending from said one point to said point of maximum gear meshing and in running clearance with the peripheral ends of the gear teeth, said convolute wall portion being straight at said inlet means and being widely spaced from said peripheral tooth ends at said inlet means and gradually approaching these tooth ends as it approaches the aforesaid one point; whereby gear-whirled fluid thrown from the between-teeth pockets of the gears will be cammed back into said pockets by the time they successively reach the aforesaid one point.

8. A structure as specified in claim 7, in which said body comprises two end members and a center plate clamped between said end members, said center plate having a gear-receiving opening cooperable with said end members in forming said gear chamber; said fluid inlet means comprising aligned unrestricted bores in said end members, the inner ends of said bore being in communication with said gear chamber, the outer ends of said bores being open at the ends of said body respectively.

9. A structure as specified in claim 7, in which said body comprises two end members and a center plate clamped between said end members, said center plate having a gear-receiving opening cooperable with said end members in forming said gear chamber; said fluid outlet means comprising two shallow recesses in the inner sides of said end members and disposed near the aforesaid point of maximum gear meshing, an oblique bore in one of said end members and communicating with the shallow recess thereof, a relatively large blind bore in said one of said end members and disposed longitudinally of said body, said relatively large blind bore extending inwardly from the outer end of said one of said end members and having its inner end in communication with said oblique bore, a second oblique bore in the other of said end members and communicating with the shallow recess thereof, and three aligned and communicating bores jointly placing the outer end of said second oblique bore in communication with the inner end of said relatively large blind bore, said three aligned bores being located one in said other of said end members, one in said center plate and one in said one of said end members, the latter bore opening laterally into the aforesaid relatively large blind bore, said three bores being aligned on an axis parallel with the gear axes and parallel with the axis of said relatively large blind bore.

10. In a rotary gear pump, a cartridge insertable into a casing and containing meshed pumping gears and inlet and outlet means therefor, said cartridge including two end plates and a single peripherally continuous center plate between said end plates, a plurality of circumferentially spaced screws extending longitudinally through openings in said end and center plates and clamping these plates together, a dowel sleeve at the high pressure side of the pump and extending through openings in said end and center plates, the axis of said dowel sleeve being parallel with the gear axes and disposed generally in the plane of maximum gear meshing, and a clamping bolt extending longitudinally through said dowel sleeve, said clamping bolt having a head at one end in abutting relation with one of said end plates and having a nut at its other end in abutting relation with the other of said end plates, and a dowel pin at the low pressure side of the pump and having its axis parallel with the axis of said dowel sleeve, said dowel pin extending through openings in said center and end plates and projecting beyond both of said end plates for reception in sockets of a casing into which the cartridge is insertible.

11. In a rotary gear pump, a cartridge insertible completely into a casing and comprising elements clamped together as a composite unit, and a dowel pin extending longitudinally through openings in said elements, one end of said dowel pin projecting beyond one end of the cartridge to engage a socket in one end member of the casing, the other end of said dowel pin projecting beyond the other end of the cartridge to engage a socket in the other end member of the casing.

12. In a rotary gear pump, a cupped member and a cap cylindrical recess 51 (full lines in FIGURE 4 and dotted in FIGURE 3). This recess is of larger diameter than the bore 47 and it is centrally placed in communication with the outlet 16 by means of a bore 52 in the cap plate 11.

Within the recess 51, a circular thrust ring 53 is mounted. This ring 53 has slight peripheral clearance with the cylindrical side wall of the recess 51; the inner side of said ring 53 abuts the end plate 30; and a single O-ring seal 54 is interposed between the outer side of said ring 53 and the end wall 55 of said recess 51. The thrust ring 53 has a narrow flange 56 surrounded by the O-ring seal 54 but this flange is spaced from the recess end wall 55 to permit the pressure of the outgoing fluid to act against the outer side of said thrust ring 53. This ring 53 thus exerts endwise pressure on the cartridge 12 centrally at the high-pressure side of the pump, to aid in resisting any tendency of the fluid pressure in the gear chamber 34 to slightly separate the cartridge end plates 30 and 30a from the center plate 31. The portion 53a of the thrust ring 53 which contacts with the cartridge end plate 30, is of reduced diameter and area and the contacting surfaces of said ring and end plate are flat-lapped to insure leak-proof engagement thereof. The differential areas of the thrust ring exposed to discharge pressure (including gradient hydraulic pressure on flat sealing faces) causes heavy abutment force on the sealing surfaces.

Longitudinal tie screws 57 (FIGURES 2, 3, 5 and 6) extend through openings 58 in the end plate 30a and through larger openings 59 in the center plate 31, and are threaded into openings 60 in the end plate 30, thereby further resisting any tendency of the plates 30, 30a and 31 to separate under the influence of pressure in the gear chamber 34. There are preferably four of these screws at the high-pressure side of the pump and two at the low pressure side.

As seen more particularly in FIGURE 4, a dowel sleeve 61 extends snugly through openings 62 and 62a in the end plates 30 and 30a, respectively, and through a larger opening 63 in the center plate 31. The dowel sleeve 61 is centrally located at the high-pressure side of the pump, as seen in FIGURE 3. A clamping bolt 64 extends through the sleeve 61, has a head 65 and washer 66 at one end, and a nut 67 at the other end. The washer 66 abuts the end plate 30a, and the nut 67 abuts the end plate 30. The clamping effect of the bolt 64 and the screws 57, particularly those at the high pressure side of the pump, combines with the pressure exerted by the thrust ring 53 to prevent any serious distortion of the end plates 30 and 30a under the pressure of the pumped fluid and thus said end plates are held tightly in place, with nothing more than running clearance between their wear plates 32 and 32a and the gears 24 and 25.

A dowel pin 68, best shown in FIGURE 5, extends snugly through openings 69 and 69a in the cartridge end plates 30 and 30a, respectively, and extends also through a larger opening 70 in the center plate 31. One end 68a of this dowel pin 68 projects beyond the end plate 30 and is received in a socket 71 in the cap plate 11. The other end 68b of the dowel pin 68 projects beyond the end plate 30a. When the gear 25 is to be driven by the drive shaft 22, as herein shown, the dowel pin end 68b is received snugly in a socket 72 in the end wall 17 of the cupped member 10, as seen in FIGURE 5. If the drive shaft 22 is to drive the gear 24, however, for reasons above explained, the cartridge 12 and cap 11 must occupy a position turned 180° from that shown. Then, the dowel pin end 68b is snugly receivable in another socket 73 (FIGURE 5) in the end wall 17 of the member 10.

The dowel sleeve 61 and dowel pin 68 align the two cartridge end plates 30 and 30a, and the pin 68 also insures proper positioning of the cartridge 12 in the casing, regardless of which gear is to be driven. Due to oversize of the various screw and dowel receiving openings in the center plate 31, this center plate may be radially adjusted slightly with respect to the end plates 30 and 30a during assembly, to obtain proper clearance with the gears 24 and 25. Due to this adjustability, the center plate 31 must be of somewhat smaller diameter than the internal diameter of the casing side wall 14. The end plates 30 and 30a, however, are of a diameter to snugly yet withdrawably fit into said side wall 14.

As seen in FIGURES 3, 6 and 8, the two screw openings 59 at the low pressure side of the pump are of considerably greater diameter than the rest of the openings 59. The openings 58 and 60 aligned with said two openings 59, are counterbored at 58a and 60a, in registration with said two openings 59. From the counterbores 58a and 60a, passages 74 extend to the regions of the grooves 27 in the peripheries of the bearing stubs 26 of the gears 24 and 25 and communicate with the central openings 38 in the wear plates 32 and 32a. Consequently, the pressure and quantity of the fluid acting to lubricate and cool the bearing stubs and bushings at one side of the gears, are equalized with the pressure and quantity of the fluid acting to lubricate and cool the bearing stubs and bushings at the other side of the gears. More uniform cooling and lubrication are thus made possible.

While only one passage 74 is shown in communication with each counterbore 58a, 60a, for illustrative purposes, an upper and a lower passage could well be employed instead, if desired.

Particular attention is invited to the following which greatly improve the pump over prior structures:

(1) The cartridge 12 may be more expeditiously and less expensively manufactured.

(2) It will better resist high-speed and high-pressure operation, as the single center plate 31 is unbroken throughout its periphery and thus effectively coacts with the end plates 30 and 30a and the connecting screws and dowels in producing a rigid cartridge body.

(3) A single simple dowel pin 68 with projecting ends 68a and 68b, aids in aligning the cartridge end plates 30 and 30a, and said projecting ends coact with the sockets 71 and 72 or 71 and 73 to insure proper positioning of the cartridge in the casing and proper positioning of the cap 11.

(4) The dowel sleeve 61 coacts with the dowel pin 68 in aligning the cartridge end plates 30 and 30a and also accommodates a simple clamping bolt 64 without requiring additional openings in the cartridge.

(5) More complete filling of the between-teeth pockets of the gears is attained and any fluid thrown from these pockets is cammed back into them by the convolute wall portions 33a of the center plate opening 33.

(6) The inlet passage 15, 41, 40, 43, 42 and 40a (FIGURE 4) not only supplies fluid to the gear chamber 34 but, when the inlet pressure is adequate, conducts some of ingoing fluid to the spaces 44a around end portions of the cartridge, for effective cooling: and any leakage from the high-pressure side of the pump enters said spaces and is returned to said inlet passage. Moreover, the fluid entering and flowing between the bushings 35 and the bearing stubs 26, for lubricating and cooling the bearings, is returned to the inlet passage through the shallow bores 39 39a. Also, the quantity and pressure of the lubricating fluid for the stubs 26 at opposite sides of the gears, are equalized, due to the passage means 59, 58a, 60a and 74 of FIGURE 6, for uniform lubrication and cooling.

(7) As the running clearance between the gears and the gear chamber wall portions 33d, and the clearance between the stubs 26 and bushings 35 should be uniform, gauging of the latter clearance with temporary shims during assembly, will necessarily create the former clearance, and any shifting of the center plate 31 which said gauging may require is permitted by the relatively large dowel and screw openings through said center plate.

From the foregoing, it will be seen that novel and advantageous construction has been provided for attaining the desired ends. However, attention is invited to the possibility of making variations within the scope of the invention.

I claim:

1. In a rotary gear pump, a casing having a side wall and end closures therefor, said casing having a fluid inlet and a fluid outlet through one of said end closures, a cartridge within said casing and including a body containing pumping gears, said cartridge body and casing having portions coacting in forming spaces between the ends of said cartridge body and said end closures, said cartridge body having a longitudinal fluid conducting inlet passage for conducting fluid to said pumping gears, said fluid conducting inlet passage extending unrestrictively from end to end of said cartridge body and having one of its ends in communication with said fluid inlet, both ends of said fluid conducting passage being also in constant communication with the aforesaid spaces.

2. In a rotary gear pump, a casing having a side wall and end closures therefor, said casing having a fluid inlet and a fluid outlet through one of said end closures, a cartridge within said casing and including a body containing pumping gears, said cartridge body and casing having portions coacting in forming spaces between the ends of said cartridge body and said end closures, said cartridge body having a longitudinal fluid conducting inlet passage for conducting fluid to said pumping gears, said fluid conducting inlet passage extending unrestrictively from end to end of said cartridge body and having one of its ends in axial communication with said fluid inlet, both ends of said fluid conducting passage being also in constant lateral communication with the aforesaid spaces.

3. A structure as specified in claim 1, in which said gear means has bearing stubs and said cartridge body has separate bearings in which said stubs are mounted, said cartridge body having fluid conducting means placing the interiors of said bearings in communication with said ends of said inlet passage respectively.

4. A structure as specified in claim 1, in which said gear means has bearing stubs and said cartridge body has bearings in which said stubs are mounted, the outer ends of said bearings being disposed at the ends of said cartridge body, said body ends having shallow bores which peripherally intersect said bearings and the aforesaid ends of said inlet passage, said shallow bores placing the outer ends of said bearings in communication with said ends of said inlet passage respectively.

5. In a rotary gear pump, a body containing pumping gears, said gears each having bearing stubs at its opposed sides, said body having separate bearings of the bushing type in which said stubs are mounted with clearance to receive some of the pumped fluid for lubrication, said body having passage means placing the bearings at one side of said gears in communication with the bearings at the other side of said gears.

6. A structure as specified in claim 5, in which said body comprises end plates and a center plate clamped together by longitudinally disposed fasteners extending through openings therein, at least some of said aligned openings having portions of sufficient internal diameter for fluid conduction axially around said fasteners and constituting longitudinal portions of said passage means, said body having transverse passages communicating with said longitudinal portions and constituting the ends of said passage means.

7. In a rotary gear pump, a body having a gear chamber and fluid inlet and outlet means therefor, meshed pumping gears mounted in said gear chamber in operative relation with said inlet and outlet means, said gear chamber having for each pumping gear a convolute side wall portion which extends from said inlet in the direction of gear rotation a substantial distance around the gear to one point spaced in degrees from the point of maximum gear meshing, said gear chamber also having a cylindrical wall portion extending from said one point to said point of maximum gear meshing and in running clearance with the peripheral ends of the gear teeth, said convolute wall portion being straight at said inlet means and being widely spaced from said peripheral tooth ends at said inlet means and gradually approaching these tooth ends as it approaches the aforesaid one point; whereby gear-whirled fluid thrown from the between-teeth pockets of the gears will be cammed back into said pockets by the time they successively reach the aforesaid one point.

8. A structure as specified in claim 7, in which said body comprises two end members and a center plate clamped between said end members, said center plate having a gear-receiving opening cooperable with said end members in forming said gear chamber; said fluid inlet means comprising aligned unrestricted bores in said end members, the inner ends of said bore being in communication with said gear chamber, the outer ends of said bores being open at the ends of said body respectively.

9. A structure as specified in claim 7, in which said body comprises two end members and a center plate clamped between said end members, said center plate having a gear-receiving opening cooperable with said end members in forming said gear chamber; said fluid outlet means comprising two shallow recesses in the inner sides of said end members and disposed near the aforesaid point of maximum gear meshing, an oblique bore in one of said end members and communicating with the shallow recess thereof, a relatively large blind bore in said one of said end members and disposed longitudinally of said body, said relatively large blind bore extending inwardly from the outer end of said one of said end members and having its inner end in communication with said oblique bore, a second oblique bore in the other of said end members and communicating with the shallow recess thereof, and three aligned and communicating bores jointly placing the outer end of said second oblique bore in communication with the inner end of said relatively large blind bore, said three aligned bores being located one in said other of said end members, one in said center plate and one in said one of said end members, the latter bore opening laterally into the aforesaid relatively large blind bore, said three bores being aligned on an axis parallel with the gear axes and parallel with the axis of said relatively large blind bore.

10. In a rotary gear pump, a cartridge insertable into a casing and containing meshed pumping gears and inlet and outlet means therefor, said cartridge including two end plates and a single peripherally continuous center plate between said end plates, a plurality of circumferentially spaced screws extending longitudinally through openings in said end and center plates and clamping these plates together, a dowel sleeve at the high pressure side of the pump and extending through openings in said end and center plates, the axis of said dowel sleeve being parallel with the gear axes and disposed generally in the plane of maximum gear meshing, and a clamping bolt extending longitudinally through said dowel sleeve, said clamping bolt having a head at one end in abutting relation with one of said end plates and having a nut at its other end in abutting relation with the other of said end plates, and a dowel pin at the low pressure side of the pump and having its axis parallel with the axis of said dowel sleeve, said dowel pin extending through openings in said center and end plates and projecting beyond both of said end plates for reception in sockets of a casing into which the cartridge is insertible.

11. In a rotary gear pump, a cartridge insertible completely into a casing and comprising elements clamped together as a composite unit, and a dowel pin extending longitudinally through openings in said elements, one end of said dowel pin projecting beyond one end of the cartridge to engage a socket in one end member of the casing, the other end of said dowel pin projecting beyond the other end of the cartridge to engage a socket in the other end member of the casing.

12. In a rotary gear pump, a cupped member and a cap plate secured together and cooperating in forming an internally cylindrical casing closed at one end by the end wall of said cupped member and closed at its other end by said cap plate, said cap plate having a fluid inlet and a fluid outlet, a cartridge within said casing and containing two meshed pumping gears, said cartridge having inlet and outlet passages communicating with said inlet and outlet of said cap plate respectively, a drive shaft extending through said end wall of said cupped member, said drive shaft being positioned for engagement with one of said gears when said shaft is to rotate clockwise and the cartridge is inserted in one position, said shaft being engageable with the other of said gears when said shaft is to rotate counterclockwise and the cartridge is inserted in another position turned 180° from said one position, and a dowel pin extending longitudinally through said cartridge and projecting beyond both ends thereof, said end wall of said cupped member having one socket to receive one end of said dowel pin when said cartridge is inserted in said one position, said end wall of said cupped member also having a second socket to receive said one end of said dowel pin when said cartridge is inserted in said other position, said cap plate having a single pocket to receive the other end of said dowel pin to assure registration of said inlet and outlet passages of said cartridge with said inlet and outlet of said cap plate respectively whether said cartridge occupies said one position or said other position.

13. In a rotary gear pump, a cartridge for insertion into a casing having an inlet and an outlet at one end; said cartridge including a body to abut the end closures of the casing, portions of the ends of said body having external cut-outs to provide fluid receiving spaces between the cartridge ends and the casing ends, said cartridge containing pumping gear means, an inlet passage for conducting fluid to said gear means and an outlet passage for conducting fluid from said gear means, said inlet passage extending unrestrictively longitudinally of the cartridge body and having both of its ends continuously in communication with the aforesaid cut-outs respectively.

14. A structure as specified in claim 13; in which said gear means has bearing stubs and said cartridge body has separate bearings in which said stubs are mounted, said cartridge body having fluid conducting means placing the interiors of said bearings in communication with said ends of said inlet passage respectively.

15. A structure as specified in claim 13, in which said gear means has bearing stubs and said cartridge body has bearings in which said stubs are mounted, the outer ends of said bearings being disposed at the ends of said cartridge body, said body ends having shallow bores which peripherally intersect said bearings and the aforesaid ends of said inlet passage, said shallow bores placing the outer ends of said bearings in communication with said ends of said inlet passage respectively.

16. In a rotary gear pump, a cartridge body insertible into a casing and containing pumping gears, said gears each having bearing stubs at its opposite sides, said body having bearings of the bushing type in which said stubs are mounted with clearance to receive some of the pumped fluid for lubrication, said body having passage means placing the bearings at one side of said gears in communication with the bearings at the other side of said gears.

17. A structure as specified in claim 16, in which said body comprises end plates and a center plate clamped together by longitudinally disposed fasteners extending through aligned openings having portions of sufficient internal diameter for fluid conduction axially around said fasteners and constituting longitudinal portions of said passage means, said body having transverse passages communicating with said longitudinal portions and constituting the ends of said passage means.

18. In a method of assembling a rotary gear pump in which a gear is to have peripheral running clearance with a gear chamber wall of one element and in which a bearing stub on said gear is to have peripheral running clearance with a bearing of another element to be secured to the first element: the assembly steps of temporarily shimming between the periphery of the bearing stub and its bearing before securing the aforesaid elements together, thereby simultaneously establishing both required clearances, then securing said elements together, and thereafter removing the shimming means.

References Cited in the file of this patent

UNITED STATES PATENTS

| | | |
|---|---|---|
| 237,764 | Medden | Feb. 15, 1881 |
| 237,988 | Medden | Feb. 22, 1881 |
| 1,379,587 | Fisher | May 24, 1921 |
| 1,446,366 | Young | Feb. 20, 1923 |
| 1,673,259 | Meston et al. | June 12, 1928 |
| 2,096,490 | Hansen | Oct. 19, 1937 |
| 2,176,322 | Barrett | Oct. 17, 1939 |
| 2,233,709 | Osborne | Mar. 4, 1941 |
| 2,391,072 | Pugh | Dec. 18, 1945 |
| 2,424,750 | Heckert | July 29, 1947 |
| 2,571,377 | Olah | Oct. 16, 1951 |
| 2,634,686 | Schmitter | Apr. 14, 1953 |
| 2,655,108 | Osborne | Oct. 13, 1953 |
| 2,665,636 | Lauck et al. | Jan. 12, 1954 |
| 2,746,394 | Dolza et al. | May 22, 1956 |
| 2,748,454 | Compton | June 5, 1956 |
| 2,764,100 | Maisch | Sept. 25, 1956 |
| 2,772,638 | Nagely | Dec. 4, 1956 |
| 2,787,224 | Udale | Apr. 2, 1957 |
| 2,794,398 | Munroe | June 4, 1957 |
| 2,816,511 | Korkowski et al. | Dec. 17, 1957 |
| 2,818,023 | Lundstrom | Dec. 31, 1957 |
| 2,880,678 | Hoffer | Apr. 7, 1959 |
| 2,960,112 | Lipinski | Nov. 15, 1960 |
| 2,986,097 | Chrzanowski et al. | May 30, 1961 |

FOREIGN PATENTS

| | | |
|---|---|---|
| 578,809 | Great Britain | July 12, 1946 |
| 888,982 | France | Sept. 20, 1943 |
| 1,103,456 | France | May 25, 1955 |